US012561195B2

(12) United States Patent
Kholodkov

(10) Patent No.: US 12,561,195 B2
(45) Date of Patent: Feb. 24, 2026

(54) LOG DATA CONDENSATION FOR INTEROPERABILITY WITH LANGUAGE MODELS

(71) Applicant: MICROSOFT TECHNOLOGY LICENSING, LLC, Redmond, WA (US)

(72) Inventor: Dmitry Valentinovich Kholodkov, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 18/671,204

(22) Filed: May 22, 2024

(65) Prior Publication Data

US 2025/0362995 A1      Nov. 27, 2025

(51) Int. Cl.
*G06F 11/07* (2006.01)
*G06F 16/901* (2019.01)
*G06F 40/284* (2020.01)

(52) U.S. Cl.
CPC ........ *G06F 11/079* (2013.01); *G06F 11/0766* (2013.01); *G06F 16/9024* (2019.01); *G06F 40/284* (2020.01)

(58) Field of Classification Search
CPC ..... G06F 11/07; G06F 11/079; G06F 11/0766
See application file for complete search history.

(56) References Cited

U.S. PATENT DOCUMENTS

| | | | | |
|---|---|---|---|---|
| 11,176,589 B2 * | 11/2021 | Pyati | ...................... | G06N 20/00 |
| 11,514,333 B2 * | 11/2022 | Han | ...................... | G06N 3/084 |
| 11,789,991 B2 * | 10/2023 | Lecue | ...................... | G06N 7/01 |
| | | | | 706/45 |
| 2021/0109995 A1 * | 4/2021 | Mihindukulasooriya | ................... | |
| | | | | G06F 40/247 |
| 2022/0358005 A1 | 11/2022 | Saha | | |
| 2024/0201983 A1 * | 6/2024 | Groenewegen | ........... | G06F 8/20 |

OTHER PUBLICATIONS

International Search Report and Written Opinion received for PCT Application No. PCT/US2025/019273, mailed on Jul. 22, 2025, 14 pages.

* cited by examiner

*Primary Examiner* — Kamini B Patel
(74) *Attorney, Agent, or Firm* — Newport IP, LLC; Jacob P. Rohwer

(57) ABSTRACT

The techniques disclosed herein provide a system for condensing large amounts of data, such as log files, to enable interoperability with language models in automated issue analysis. In various contexts such as enterprise cloud services, data oftentimes contains millions of lexical units that can incur significant processing time and resource consumption. As such, the disclosed techniques provide a system for producing a directional knowledge graph representing a condensed form of the data for automated issue analysis. Firstly, the data is preprocessed to filter information that is irrelevant to the issue that previously occurred. The filtered lexical units are then used to generate a directional knowledge graph comprising a plurality of vertices which correspond to individual lexical units, and which are connected by edges representing the semantic connection between the lexical units. In this way, the directional knowledge graph significantly reduces processing times and improves resource consumption.

20 Claims, 10 Drawing Sheets

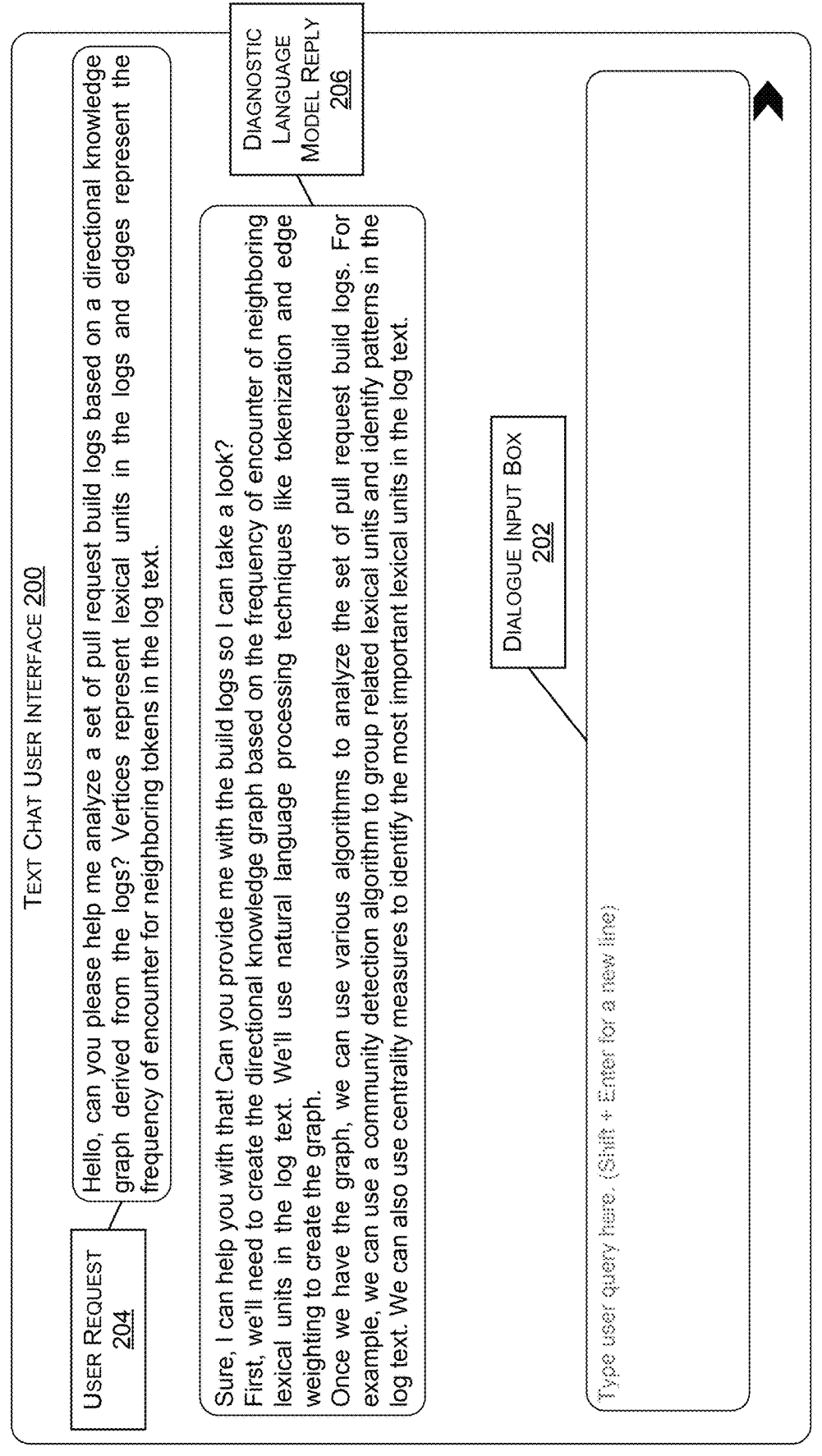

TEXT CHAT USER INTERFACE 200

USER REQUEST 204

Hello, can you please help me analyze a set of pull request build logs based on a directional knowledge graph derived from the logs? Vertices represent lexical units in the logs and edges represent the frequency of encounter for neighboring tokens in the log text.

DIAGNOSTIC LANGUAGE MODEL REPLY 206

Sure, I can help you with that! Can you provide me with the build logs so I can take a look?
First, we'll need to create the directional knowledge graph based on the frequency of encounter of neighboring lexical units in the log text. We'll use natural language processing techniques like tokenization and edge weighting to create the graph.
Once we have the graph, we can use various algorithms to analyze the set of pull request build logs. For example, we can use a community detection algorithm to group related lexical units and identify patterns in the log text. We can also use centrality measures to identify the most important lexical units in the log text.

DIALOGUE INPUT BOX 202

Type user query here. (Shift + Enter for a new line)

FIG. 2A

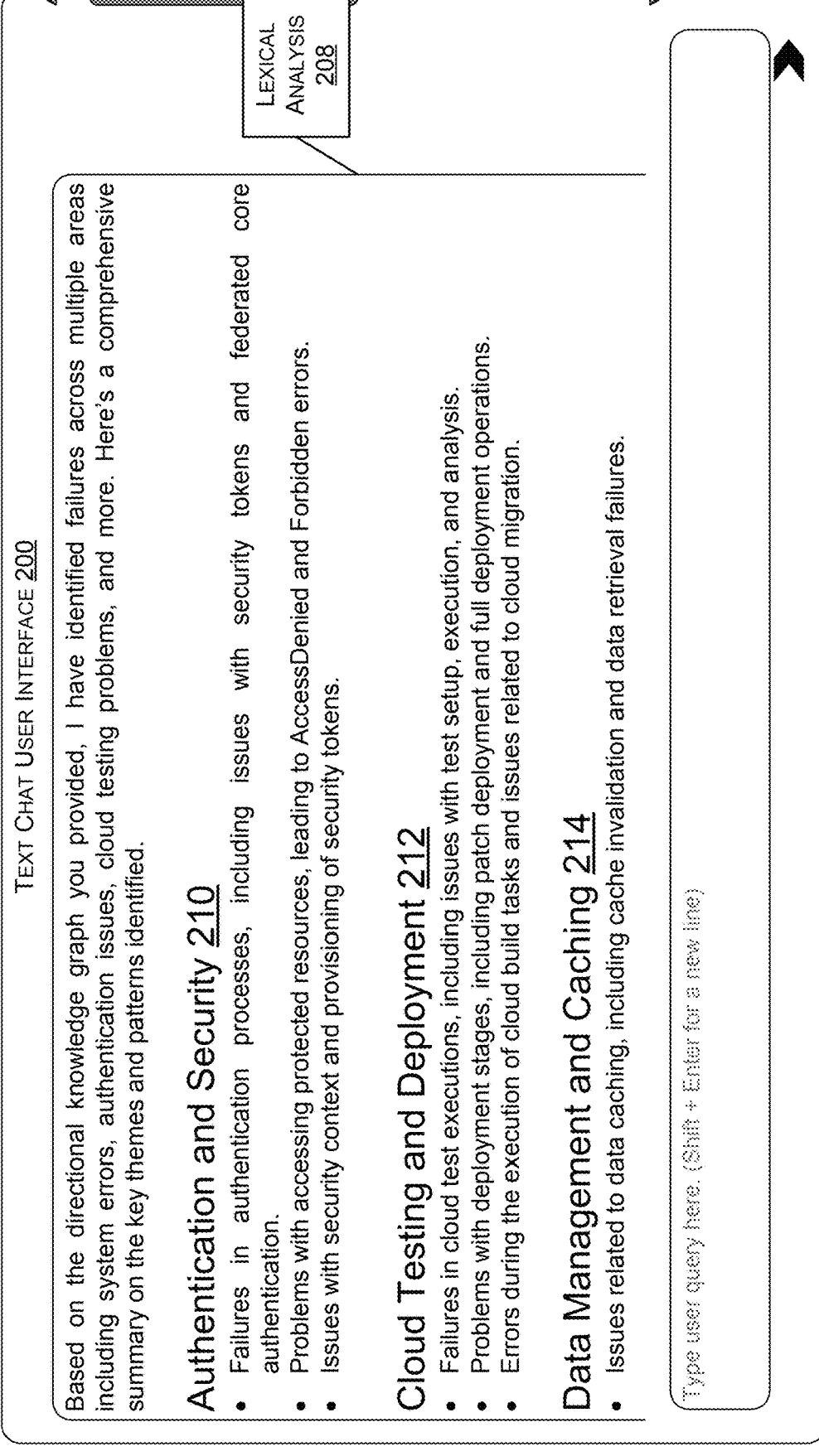

TEXT CHAT USER INTERFACE 200

Based on the directional knowledge graph you provided, I have identified failures across multiple areas including system errors, authentication issues, cloud testing problems, and more. Here's a comprehensive summary on the key themes and patterns identified.

Authentication and Security 210

- Failures in authentication processes, including issues with security tokens and federated core authentication.
- Problems with accessing protected resources, leading to AccessDenied and Forbidden errors.
- Issues with security context and provisioning of security tokens.

Cloud Testing and Deployment 212

- Failures in cloud test executions, including issues with test setup, execution, and analysis.
- Problems with deployment stages, including patch deployment and full deployment operations.
- Errors during the execution of cloud build tasks and issues related to cloud migration.

Data Management and Caching 214

- Issues related to data caching, including cache invalidation and data retrieval failures.

LEXICAL ANALYSIS 208

Type user query here (Shift + Enter for a new line)

FIG. 2B

MULTIMODAL CHAT USER INTERFACE 400

DIAGNOSTIC LANGUAGE MODEL REPLY 412

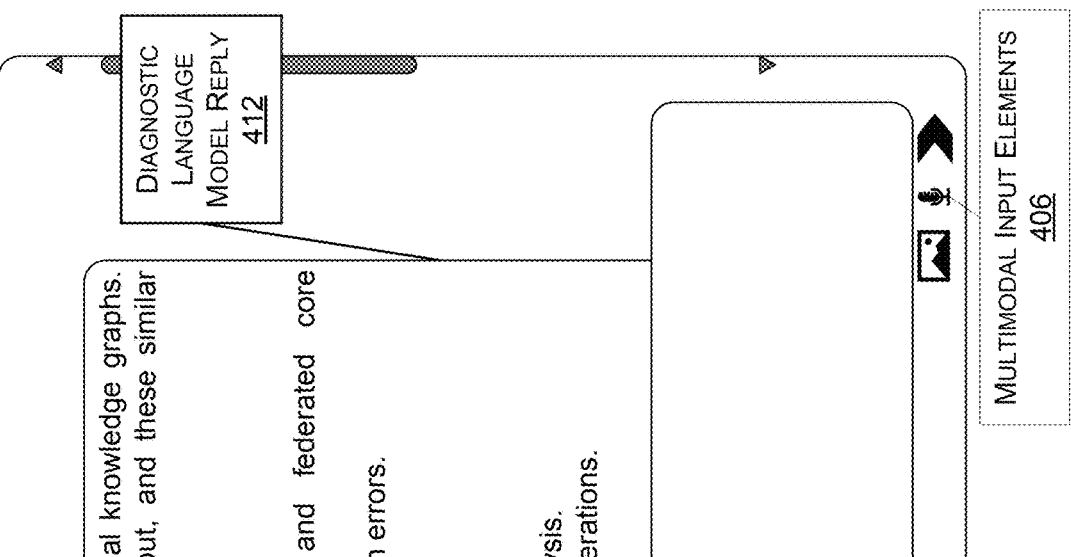

Based on your submitted image, I have detected several substantially similar directional knowledge graphs. Here are the failures I have detected from analyzing your text input, your image input, and these similar directional knowledge graphs.

Authentication and Security

- Failures in authentication processes, including issues with security tokens and federated core authentication.
- Problems with accessing protected resources, leading to AccessDenied and Forbidden errors.
- Issues with security context and provisioning of security tokens.

Cloud Testing and Deployment

- Failures in cloud test executions, including issues with test setup, execution, and analysis.
- Problems with deployment stages, including patch deployment and full deployment operations.
- Errors during the execution of cloud build tasks and issues related to cloud migration.

Type user query here. (Shift + Enter for a new line)

MULTIMODAL INPUT ELEMENTS 406

FIG. 4B

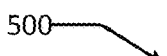

500

RETRIEVE LOG FILE COMPRISING A FIRST NUMBER OF LEXICAL UNITS
502

PREPROCESS THE LOG FILE TO EXTRACT A SECOND NUMBER OF LEXICAL UNITS FROM THE LOG FILE BASED ON A RELEVANCE TO A FAILURE, THE SECOND NUMBER OF LEXICAL UNITS BEING LESS THAN THE FIRST NUMBER OF LEXICAL UNITS
504

GENERATE A DIRECTIONAL KNOWLEDGE GRAPH REPRESENTING A CONDENSED FORM OF THE LOG FILE USING THE SECOND NUMBER OF LEXICAL UNITS WHEREIN THE DIRECTIONAL KNOWLEDGE GRAPH COMPRISES A PLURALITY OF VERTICES CONNECTION BY A PLURALITY OF EDGES; AN INDIVIDUAL VERTEX REPRESENTS A UNIQUE LEXICAL UNIT; AND AN INDIVIDUAL EDGE REPRESENTS A SEMANTIC CONNECTION BETWEEN A PAIR OF LEXICAL UNITS
506

PROVIDE THE DIRECTIONAL KNOWLEDGE GRAPH TO A DIAGNOSTIC LANGUAGE MODEL
508

RECEIVE, FROM THE DIAGNOSTIC LANGUAGE MODEL, A LEXICAL ANALYSIS IDENTIFYING A SOURCE OF THE FAILURE FOR THE COMPUTING SYSTEM BASED ON THE DIRECTIONAL KNOWLEDGE GRAPH.
510

LOG DATA CONDENSATION FOR INTEROPERABILITY WITH LANGUAGE MODELS

BACKGROUND

Modern computing platforms such as cloud computing services involve large, complex hardware systems executing equally complex software systems servings thousands and even millions of users. To maintain consistent service, such platforms often rely on hundreds or thousands of individuals (e.g., software engineers, system administrators) compiling source code to implement new features, fix bugs, and other such activities that are collectively referred to as "building" or "build events" (e.g., "running a software build"). Moreover, external users can likewise develop and execute build events of their own. Consequently, a given computing platform can execute millions of individual build events per day.

An individual build event typically utilizes infrastructure for detecting errors and/or issues in the source code and accordingly providing visibility into those errors and/or issues by way of a log file. In various examples, a log file is a text file recording the context of an associated build event as well as incidents that occurred during the build event. For instance, a log file can include a timestamp at which the build event began, the type of build event, the status of various unit tests that were executed on the source code and so forth. In this way, log files improve the engineering experience by ensuring repeatability and detectability when diagnosing build errors, improving operations, and enhancing efficiency.

However, individual log files can be large, often comprising thousands of events and millions of words which can be infeasible for an engineer to manually analyze. As such, a computing platform operator (e.g., a cloud service provider) may wish to alleviate this burden by providing automated analysis tools such as artificial intelligence (AI) language models. Unfortunately, many such language models can incur significant processing times when analyzing large text inputs with some implementing an upper limit input size thereby preventing analysis of large log files. Moreover, existing methods for accommodating input size limits such as splitting a log file into smaller pieces (e.g., chunking) may lead to inaccurate and/or incorrect analysis due to data loss resulting from the splitting.

It is with respect to these and other considerations that the disclosure made herein is presented.

SUMMARY

The techniques disclosed herein provide a compression system for condensing large amounts of data to enable interoperability with automated analysis tools such as transformer-based large language models (LLMs). Unlike other artificial intelligence models, such as recurrent neural networks and long short-term memory (LSTM) models, large language models utilize a native self-attention mechanism to identify vague context from limited available data and even synthesize new content. Consequently, large language models are a strong candidate for automated analysis and summarization of complex data such as log files.

Using the example mentioned above, log files can be large oftentimes recording thousands of events and containing millions of words. As such, simply inputting a log file to a large language model for analysis can incur significant processing costs (e.g., resource consumption, time). Indeed, many such models implement a maximum input size (e.g., 128 thousand words) to prevent overloading. Moreover, existing methods for accommodating input size limits involve splitting data into smaller pieces (e.g., chunking) which can lead to information loss and subsequently inaccurate and/or incorrect analyses. Such challenges are exacerbated within the context of enterprise software engineering in which a given build event produces a significant amount of data due to policy complexities and the sensitivity of various cloud computing services (e.g., live collaboration services).

As such, the disclosed techniques provide a system for producing a directional knowledge graph representing a condensed form of data for event analysis. Generally described. a directional knowledge graph is a graph-structured data model and/or topology that represents interlinked descriptions of entities (e.g., objects, events, situations) and encodes the semantic connections underlying such entities. In various examples, a directional knowledge graph comprises a plurality of vertices which correspond to individual entities, and which are connected by edges representing the semantic connection between individual entities. As will be described below, a directional knowledge graph can be represented textually, visually, and/or in any other suitable medium.

To generate the directional knowledge graph, the compression system retrieves data (e.g., a log file) defining the state of a computing system during an event that includes an issue such as a failure (e.g., a build error). In various examples, the data is retrieved from a compilation environment such as a remote build server that is executing a build event that produced the data. Within the context of the present disclosure, the data is said to comprise a first number of lexical units. Generally described, a lexical unit, also referred to as a token, represents a basic unit of meaning within a natural language text such as individual words and/or characters that has been translated into a numerical representation for processing by computational models such as large language models.

The data is then preprocessed to extract a second number of lexica units from the first number of lexical units based on a relevance to the issue that occurs during the event. In a specific example, preprocessing the data comprises detecting successful unit tests in the data and removing them from consideration as a successful unit test most likely does not indicate the cause of a failure. In another example, preprocessing the data involves removing punctuation marks from the data that, while useful for making the data human-readable can impede analysis by a language model.

Accordingly, the second number of lexical units are then used to generate the directional knowledge graph comprising a plurality of vertices connected by a plurality of edges. As mentioned above, an individual vertex represents a unique one of the second number of lexical units. For instance, while the lexical unit "BuildID" may appear five hundred times in the second number of lexical units, the directional knowledge graph may include just one vertex representing the "BuildID" lexical unit. As also mentioned, an individual edge represents a semantic connection between a pair of lexical units.

The directional knowledge graph is then provided to a language model for analysis (e.g., via a chat interface). In a specific example, the language model is a large language model that is configured (e.g., via a prompt) to assist a user in finding and analyzing information. As such, the language model executes a lexical analysis on the directional knowledge graph to summarize the data and identify one or several sources of the issue that occurs during the event. In various examples, the lexical analysis identifies failed unit tests, warnings thrown by the compilation environment, and the like. The lexical analysis is then returned to the user to provide insight into the information captured by the data.

In one example of the technical benefit of the present disclosure, condensing the data in this way enables a significant reduction in the volume of input data while retaining the original information. In various examples, data comprising five million lexical units can be reduced to under ten thousand lexical units when condensed into a directional knowledge graph. Consequently, a reduction in size of this magnitude leads to reduced computing resource consumption and reduced processing times, a common technical challenge in the realm of large language model-based applications.

In another example of the technical benefit of the present disclosure, formatting the condensed data as a directional knowledge graph enables further increases in processing efficiency due to intrinsic compatibility with large language models. In general terms, the strong lexical performance of large language models (e.g., summarization, analysis) stems from directional knowledge graphs. Essentially, a large language model is constructed from directional knowledge graphs. As such, by formatting the data such that a large language model can immediately "understand" and reason with can further reduce computing resource consumption and processing times thereby improving the efficiency of diagnostic systems and reducing the tedious technical burden on individual users (e.g., engineers) when troubleshooting.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 2A illustrates an example text chat user interface for initiating a lexical analysis from a diagnostic language model.

FIG. 2B illustrates the example text chat following a response from the diagnostic language model identifying the source of failures within the log file.

FIG. 4B illustrates the multimodal chat user interface following a lexical analysis by a diagnostic language model for a multimodal input.

FIG. 5 is a flow diagram showing aspects of a process for compressing a log file defining a state of a computing system during a failure for analysis by a diagnostic language model.

FIG. 7 is a diagram illustrating a distributed computing environment capable of implementing aspects of the techniques and technologies presented herein.

DETAILED DESCRIPTION

The techniques disclosed herein provide a compression system for condensing large log files to enable interoperability with automated analysis tools such as transformer-based large language models (LLMs). As mentioned above, log files can be large oftentimes recording thousands of events and containing millions of words. As such, simply inputting a log file to a large language model for analysis can incur significant processing costs (e.g., resource consumption, time). As such, the disclosed techniques provide a system for producing a directional knowledge graph representing a condensed form of a log file comprising a plurality of vertices connected by a plurality of edges. In this way, the log file is converted to a format that is intrinsically compatible with the internal structure of large language models thereby improving accuracy, reducing processing times, and increasing computing resource efficiency.

Various examples, scenarios, and aspects related to the techniques are described below with respect to FIGS. 1-7.

Figure 1:
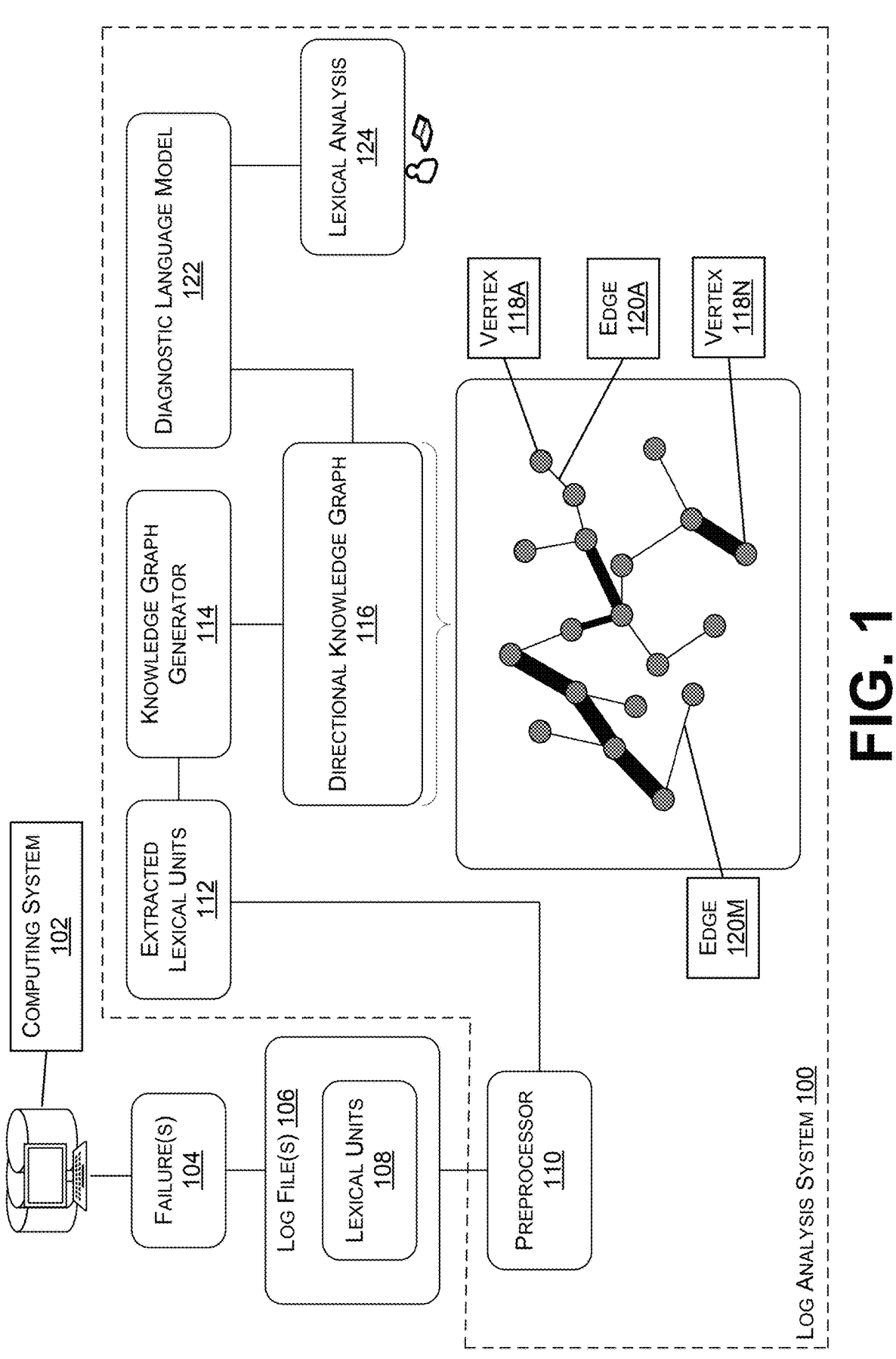
FIG. 1 is a block diagram of a system for generating a directional knowledge graph representing a condensed form of a log file for analysis by a diagnostic language model.

FIG. 1 illustrates a log analysis system 100 in which a computing system 102 experiences a failure 104 causing termination of a build event. In various examples, the computing system 102 is a cloud computing system that includes infrastructure for providing a cloud service (e.g., live collaboration) as well as infrastructure for deploying software to operate the cloud service. Within the context of the present example, the failure 104 is a build failure within a source code compilation environment executing a build event. Accordingly, the log analysis system 100 retrieves a log file 106 from the computing system 102 defining a state of the computing system 102 during the failure 104.

As mentioned above, the log file 106 is a text file records the context of an associated build event (e.g., file names, testing durations, execution identifiers) as well as incidents that occurred during the build event (e.g., successful unit tests, failed unit tests, warnings, errors). As such, the log file 106 comprises a first number of lexical units 108. Generally described, a lexical unit 108, which can also be referred to as a token, is any individual unit of meaning such as an individual character, a word, or even a sentence that has been translated into a numerical representation. For the purposes of discussion, a lexical unit 108 can be understood as representing an individual word.

The log file 106 is then provided to a preprocessor 110 in preparation for analysis. In various examples, the preprocessor 110 filters the lexical units 108 of the log file 106 based on a relevance to the failure 104 to generate a set of extracted lexical units 112. That is, the extracted lexical units 112 are a second number of lexical units that is less than the first number of lexical units 108. Generally described, lexical units 108 that are relevant to the failure 104 are those which describe any issues that occurred when compiling the source code of the build event. Stated another way, the preprocessor 110 determines which of the lexical units 108 are most probably associated with the failure 104. For instance, lexical units 108 that are associated with a successful unit test are most likely irrelevant to the failure 104. Conversely, lexical units 108 that are associated with failed unit tests, compilation errors, warnings, and the like most likely are relevant to the failure 104 and are thus included in the extracted lexical units 112.

As the number of lexical units 108 that are relevant to the failure 104 is oftentimes much less than the number of lexical units 108 that are irrelevant to the failure 104 (e.g., more successful unit tests than failed unit tests), the extracted lexical units 112 will typically be much fewer than the total lexical units 108. In addition, the preprocessor 110 removes extraneous lexical units 108 such as formatting (e.g., tabs, spaces, line breaks) and punctuation marks to further reduce the number of extracted lexical units 112. In various examples, it is advantageous to achieve a small number of extracted lexical units 112 as reducing the input size can lead to proportionally improved analytical accuracy and reduced processing time.

The extracted lexical units 112 are accordingly input to a knowledge graph generator 114 to be reformatted into a directional knowledge graph 116. In various examples, the knowledge graph generator 114 is a standalone software component that utilizes a semantic data model (SDM) comprising a formalized template that defines the way in which semantic relationships are represented in the directional knowledge graph 116. Examples of semantic data models include the Resource Description Framework (RDF) specification and the associated Web Ontology Language (OWL).

As shown, the directional knowledge graph 116 comprises a plurality of vertices 118A-118N connected by a plurality of edges 120A-120M. In contrast to the extracted lexical units 112 derived from the log file 106, in which the semantic connections between words is implicit and thus must be inferred (e.g., via human reading, via natural language processing techniques), the directional knowledge graph 116 explicitly encodes these semantic connections in the edges 120A-120M. In addition, the edges 120 encode the frequency of encounter for connected vertices 118 representing neighboring lexical units in the 112 in the log file 106. As shown in the visualization of the directional knowledge graph 116, the thickness of a given edge represents the frequency of encounter with a thicker edge representing a higher frequency (e.g., a stronger connection) than a thinner edge (e.g., a weaker connection).

It should be understood that the directional knowledge graph 116 illustrated in FIG. 1 is a visual representation that is provided for the sake of clarity and discussion. In practice, the directional knowledge graph 116 may contain thousands of individual vertices 118A-118N and a commensurately large number of edges 120A-120M. Moreover, as will be discussed below, the directional knowledge graph 116 can be represented in any suitable format including text, image, and/or audio.

In various examples, the knowledge graph generator 114 is configured with a desired resolution with which to generate the directional knowledge graph 116. For instance, a user desiring highly detailed and granular analysis can configure a high resolution with knowledge of the tradeoff such resolution imposes (e.g., increased processing time). Conversely, a lower resolution results in a high-level analysis capturing strong trends while omitting certain details and/or less common trends.

Furthermore, the log analysis system 100 processes more and more log files 106, the resulting directional knowledge graphs 116 can be consecutively overlaid to build a relational directional structure that enables the downstream learning. For instance, the log analysis system 100 can be deployed in a specialized context such as analyzing log files 106 from a specific cloud computing service or portion of a cloud computing service. As such, the log analysis system 100 can build a relational directional structure that records long-term trends and tendencies in the log files 106 to improve diagnostic performance over time. In addition, the relational directional structure can also be scaled to fit input sizes depending on the context and/or resource constraints.

Subsequently, the directional knowledge graph 116 is provided to a diagnostic language model 122 for analysis. As mentioned above, the diagnostic language model 122 is a large language model that is configured via a prompt (e.g., an instruction) to aid a user in collecting and/or analyzing information. Accordingly, the diagnostic language model 122 generates a lexical analysis 124 of the directional knowledge graph 116 that identifies the source of the failure 104 such as process failures, functional problems, and operational errors. In various examples, the diagnostic language model 122 utilizes various algorithms to traverse the directional knowledge graph 116 to identify the lexical relationships therein. In a specific example, the diagnostic language model 122 first executes a community detection algorithm to group related lexical units of the extracted lexical units 112 and identify patterns captured in the text of the log file 106. Secondly, the diagnostic language model executes a centrality algorithm to identify the most important vertices 118 of the directional knowledge graph 116 based on their connections to other vertices (e.g., vertices 118 with many connections are more important than vertices 118 with few connections).

In addition, the diagnostic language model 122 can categorize the various sources of the failure 104 (e.g., security failures, data management failures, file and stream operations failures) within the lexical analysis 124. In this way, thanks to the specific nature of the directional knowledge graph, the diagnostic language model 122 provides visibility into failures 104 that would have previously required detailed manual reading and analysis.

Turning now to FIG. 2A, an example of a text chat user interface 200 for enabling interaction with a diagnostic language model, such as the diagnostic language model 122 discussed above, are shown and described. Generally described, the text chat interface 200 is a graphical user interface (GUI) comprising a dialogue input box 202 through which a user can submit a text query to the diagnostic language model much as one would send a text message to another person. In this way, the text chat user interface 200 provides an engaging user experience by facilitating natural conversation.

Accordingly, the user has submitted a user request 204 asking the diagnostic language model to "help me analyze a set of pull request build logs." In various examples, the user request 204 can also be referred to as a prompt. In addition, the user request 204 instructs the diagnostic language model to perform the analysis "based on a directional knowledge graph derived from the logs." By including additional instructions for the diagnostic language model to follow, the user request 204 prevents undesirable behavior and/or extraneous output. Moreover, the user request 204 provides additional context by informing the diagnostic language model that "vertices represent lexical units (e.g., tokens) in the logs and edges represent the frequency of encounter for neighboring tokens in the log text."

In response, the diagnostic language model generates a diagnostic language model reply 206 confirming the instructions provided by the user request 204. In addition, the diagnostic language model reply 206 explains the approach the diagnostic language model will use when analyzing the provided log files. As shown, the diagnostic language model reply 206 states that a directional knowledge graph will be generated from the log files using "natural language processing techniques like tokenization and edge weighting." Then, the diagnostic language model reply 206 describes some of the algorithms it will use to traverse the directional knowledge graph such as the community detection algorithm and centrality algorithm mentioned above.

Turning now to FIG. 2B. the diagnostic language model generates a lexical analysis 208 following a period of processing the directional knowledge graph. Accordingly, the lexical analysis 208 is returned to the user via a new message in the text chat user interface 200. As mentioned above, the lexical analysis 208 identifies sources of a computing system failure. In the present example, the failure occurs during a build event for a cloud-based software service. As also mentioned above, the lexical analysis 208 organizes the sources of failure into various diagnostic categories. For example, an "Authentication and Security" category 210 includes failures in issues with security tokens and federated core authentication, problems access protected resources, and the like. Likewise, a "Cloud Testing and Deployment" category 212 includes "failures in cloud test executions, including issues with test setup, execution, and analysis." In still another example, the lexical analysis includes a "Data Management and Caching" category 214 describing "issues related to data caching, including cache invalidation and data retrieval failures." While the example of FIG. 2B illustrates some specific examples, it should be understood that such a lexical analysis 208 can include any diagnostic categories of failure. In this way, the lexical analysis 208 enables an organized structure to provide the user with clear insight into log files and subsequently make informed decisions based on the lexical analysis 208.

Figure 3A:
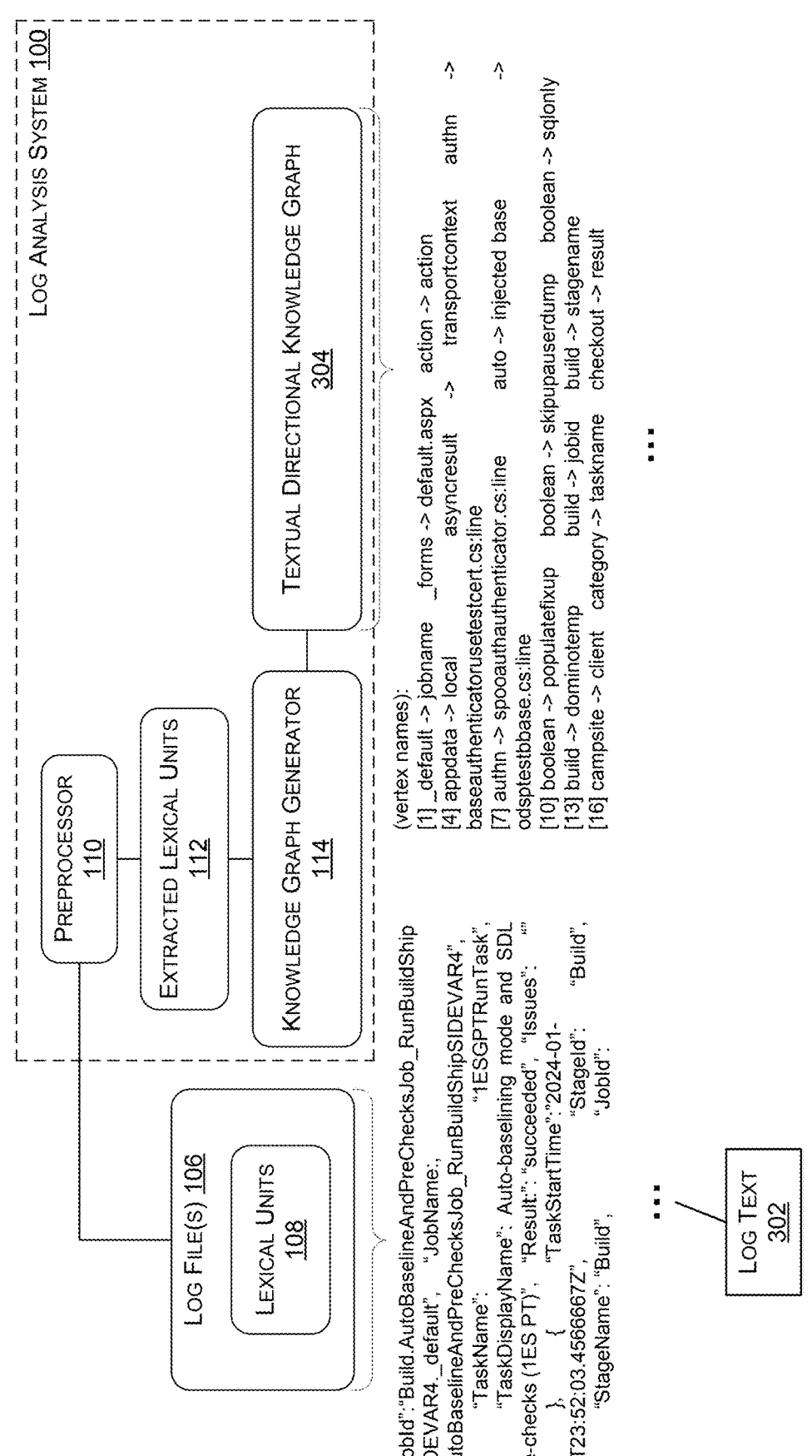
FIG. 3A illustrates an example of converting a log file text into a textual representation of the directional knowledge graph.

Proceeding to FIG. 3A, additional details regarding the generation of the directional knowledge graph are shown and described. Similar to the examples described above, a log file 106 comprising a first number of lexical units 108 is input to a log analysis system 100. As shown, in the snippet of log text 302, the log file 106 is formatted as a human readable text file comprehensively describing the conditions and incidents that occurred during an associated build event. For instance, the log text 302 indicates within a set of curly braces that for a "JobName" titled "AutoBaselineAndPreChecksJob_RunBuildShipSIDEVAR4" the "Result" is "succeeded". However, drawing such a conclusion requires the intuition to associate the "JobName" field with "AutoBaselineAndPreChecksJob_RunBuildShipSIDEVAR4" and likewise that the "Result" field is associated with "succeeded" and that both relate to the same event (e.g., a unit test). That is, the semantic connections between the lexical units 108 are implicit rather than explicitly expressed in the log text 302.

While an automated analysis tool such as a large language model can infer such connections through various natural language processing methods, such techniques can be expensive (e.g., resource intensive, time consuming). Such drawbacks are further exacerbated as the log text 302 grows in size and complexity. As mentioned above, an individual log file 106 can comprise millions of lexical units 108 thereby rendering many conventional techniques infeasible. Moreover, due to input size limits (128 thousand lexical units) implemented by many large language models, a large log file 106 must be split into smaller pieces (e.g., chunking). This can lead to increased risk of information loss in the event the log file is split at a disadvantageous position such as splitting a field title (e.g., "Result") from the associated data (e.g., "succeeded").

To preserve information integrity and reduce processing times, the log file 106 is input to the log analysis system 100 in which the lexical units 108 are filtered by a preprocessor 110 to generate a set of extracted lexical units 112 for input to a knowledge graph generator 114 as described above with respect to FIG. 1. The knowledge graph generator 114 accordingly generates a textual directional knowledge graph 304. In a specific example, the textual directional knowledge graph 304 comprises a list of vertex names (e.g., "_default", "jobname" "_forms") connected by arrows ("→") representing the semantic connection between two vertices. For instance, "_default→jobname" indicates that the "_default" vertex corresponds to the "jobname" vertex. Moreover, the boxed number (e.g., [1]) of each row represents a strength of the semantic connection between each pair of vertices. For example, a [1] represents a relatively weaker semantic connection than a [16]. In a specific example, the strength of connection is determined based on a frequency of encounter for neighboring lexical units. In another example, the strength of connection between two vertices is determined based on their connection to other vertices. That is, two vertices that connect to each other and no other vertices can be said to have a strong semantic relationship.

Consequently, the textual directional knowledge graph 304 for a log file 106 comprising millions of lexical units 108 can comprise thousands of lexical units representing a thousandfold condensation of the log file 106 while retaining all the quantitative features of the original log file. By reducing the size of the input data in this way, the textual directional knowledge graph 304 can dramatically reduce processing time when input to the diagnostic language model. Moreover, formatting the input data as a directional knowledge graph 304, takes advantage of the inherent structure of the diagnostic language model to further improve processing efficiency.

Figure 3B:
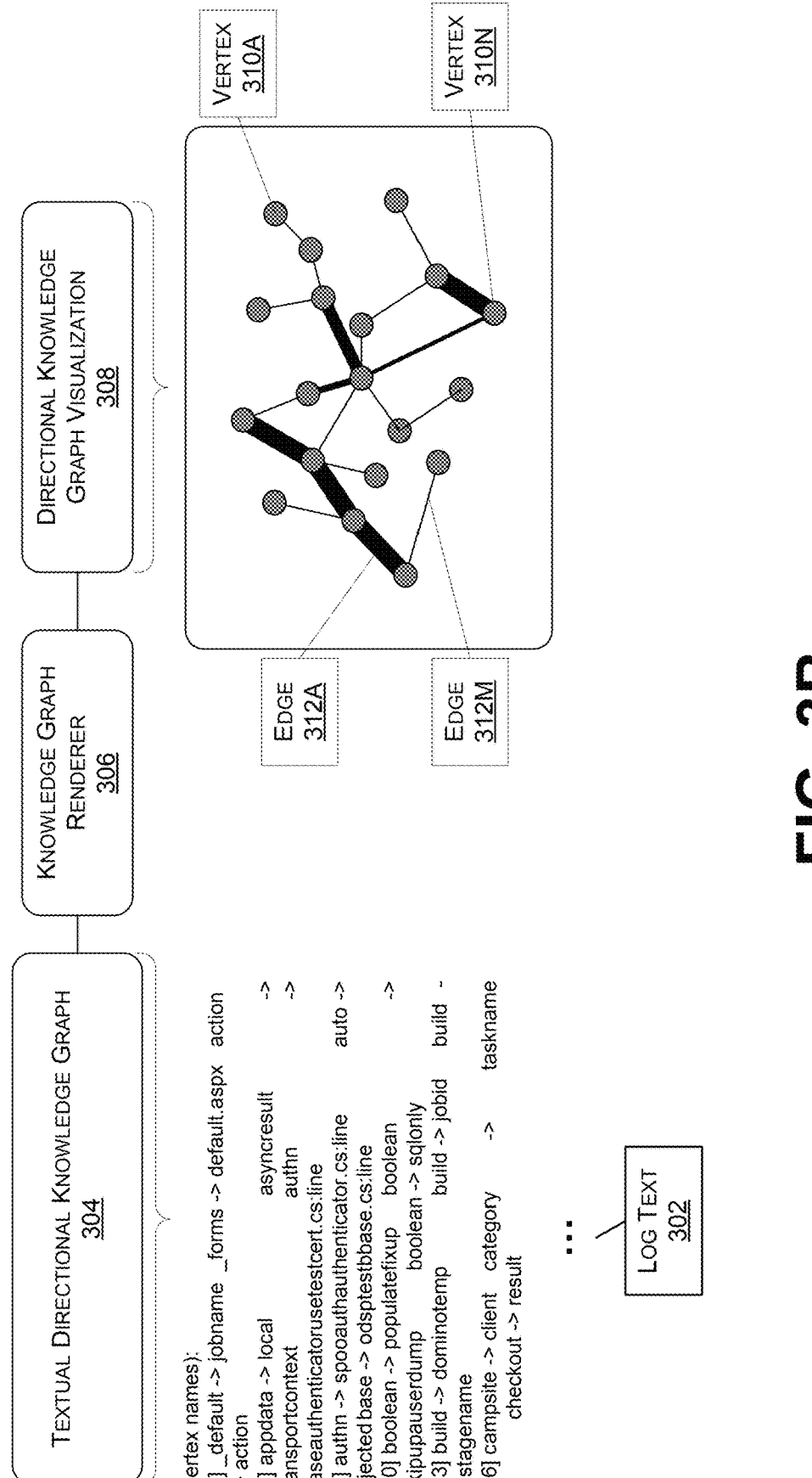
FIG. 3B illustrates a visual rendering of the textual representation of the directional knowledge graph.

Turning now to FIG. 3B, the textual directional knowledge graph 304 can be provided to a knowledge graph renderer 306 for additional processing to generate a directional knowledge graph visualization 308 comprising a plurality of vertices 310A-310N connected by a plurality of edges 312A-312M. In various examples, the knowledge graph renderer 306 places vertices within the directional knowledge graph 308 based on the relative position of the associated lexical unit and the frequency of encounter within the log text 302. For example, a lexical unit that occurs frequently in the textual directional knowledge graph 304 results in a vertex that is placed in the middle of the directional knowledge graph visualization 308. Conversely, a lexical unit that occurs relatively infrequently is placed at the edge of the directional knowledge graph visualization.

As described above with respect to FIG. 1, the directional knowledge graph 116 can be formatted in any suitable format (e.g., text, image) to enable analysis by the diagnostic language. As such, it should be understood that the directional knowledge graph visualization 308 and the textual directional knowledge graph 304 are representations of the same directional knowledge graph 116. As will be described below, the directional knowledge graph visualization 308 can be utilized by a diagnostic language model in a similarity analysis for detecting patterns across different log files and/or contexts.

Figure 4A:
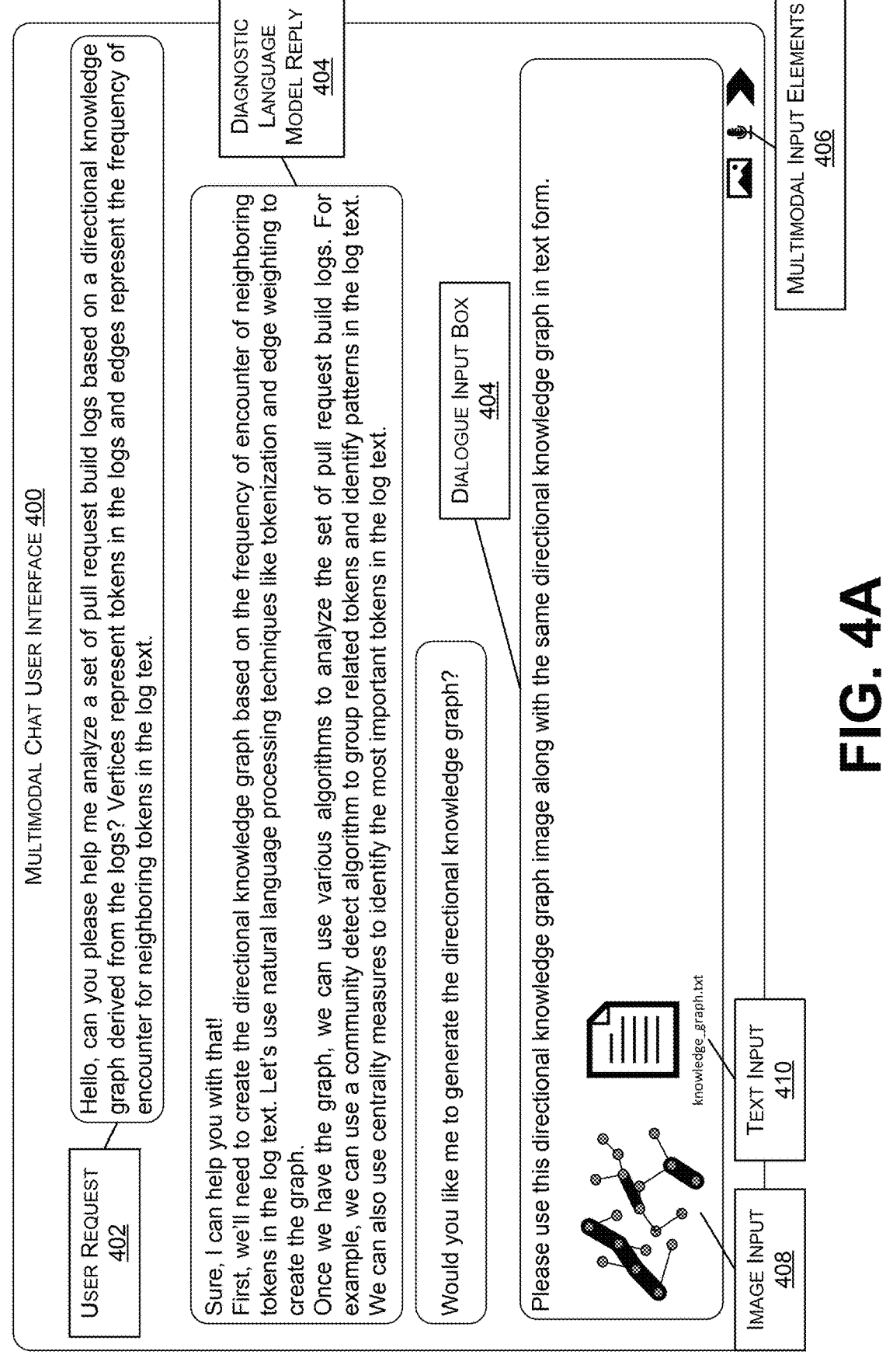
FIG. 4A illustrates an example of a multimodal chat user interface supporting multimodal input to the diagnostic language model.

Turning now to FIG. 4A aspects of a multimodal chat user interface 400 are shown and described. Similar to the examples discussed above with respect to FIG. 2A, a user can submit a user request 402 via a dialogue input box 404 requesting a diagnostic language model "help me analyze a set of pull request logs". Accordingly, the diagnostic language model replies as above by confirming the request and describing the analysis process. In addition, the diagnostic language model can ask the user if they would like the diagnostic language model to generate the directional knowledge graph. In response, the user instructs the diagnostic language model to "use this directional knowledge graph image along with the same directional knowledge graph in text form." Accordingly, the user activates the multimodal input elements 406 to submit an image input 408 and a text input 410. As mentioned above both the image input 408 and the text input 410 are different representations the same directional knowledge graph.

Proceeding to FIG. 4B, the diagnostic language model generates a diagnostic language model reply to the image input 408 and the text input 410. In various examples, the diagnostic language model executes a similarity analysis on the image input 408 to determine if the diagnostic language model has previously encountered a similar situation captured by the associated directional knowledge graph. That is, the diagnostic language model searches for previously analyzed images of directional knowledge graphs that bear a threshold level of similarity to the submitted image input 408. As such, the diagnostic language model reply 412 states that the diagnostic language model has "detected several substantially similar directional knowledge graphs." Accordingly, the failures enumerated by the diagnostic language model reply can be derived from the image input 408, the text input 410, and the similar directional knowledge graphs. In this way, the diagnostic language model can take advantage of previous analysis work to inform and/or enhance the present analysis resulting in further improvements to computing resource efficiency and processing times.

Turning now to FIG. 5, aspects of a process 500 for compressing a log file defining a state of a computing system during a failure for analysis by a diagnostic language model are shown and described. With respect to FIG. 5, the process 500 begins at operation 502 where a log analysis system retrieves a log file comprising a first number of lexical units. As described above, the log file records the conditions of an associated event at a computing system (e.g., a build event) and is thus useful for diagnosing failures and troubleshooting. Log files are also large, oftentimes containing millions of lexical units (e.g., tokens).

Next, at operation 504, the log analysis system preprocesses the log file to extract a second number of lexical units based on a relevance to a failure, wherein the second number of lexical units is less than the first number of lexical units.

In various examples, preprocessing the log file involves removing text that is most likely not useful for diagnosing the failure (e.g., successful unit tests) as well as removing extraneous text (e.g., punctuation marks) that may introduce noise when provided to automated analysis tools such as large language models.

Then, at operation 506, the log analysis system generates a directional knowledge graph representing a condensed form of the original log file using the second number of lexical units. As described above, the directional knowledge graph comprises a plurality of vertices connected by a plurality of edges in which an individual vertex corresponds to a unique lexical unit of the second number of lexical units and an individual edge represents a semantic connection between a pair of lexical units of the second number of lexical units.

Proceeding to operation 508, the log analysis system provides the directional knowledge graph to a diagnostic language model. As described above, the diagnostic language model is a large language model that is configured by a prompt to assist a user with collecting and analyzing information. In a specific example, the directional knowledge graph is provided to the diagnostic language model by way of a text chat user interface. In another example, the directional knowledge graph is provided to the diagnostic language model by way of a multimodal chat user interface (e.g., audio, image, text).

Finally, at operation 510, the log analysis system receives a lexical analysis from the diagnostic language model identifying a source of the failure for the computing system based on the directional knowledge graph. As shown above, the lexical analysis can organize the failures detected by the large language model into various diagnostic categories (e.g., (e.g., security failures, data management failures, file and stream operations failures).

For ease of understanding, the process discussed in this disclosure is delineated as separate operations represented as independent blocks. However, these separately delineated operations should not be construed as necessarily order dependent in their performance. The order in which the process is described is not intended to be construed as a limitation, and any number of the described process blocks may be combined in any order to implement the process or an alternate process. Moreover, it is also possible that one or more of the provided operations is modified or omitted.

The particular implementation of the technologies disclosed herein is a matter of choice dependent on the performance and other requirements of a computing device. Accordingly, the logical operations described herein are referred to variously as states, operations, structural devices, acts, or modules. These states, operations, structural devices, acts, and modules can be implemented in hardware, software, firmware, in special-purpose digital logic, and any combination thereof. It should be appreciated that more or fewer operations can be performed than shown in the figures and described herein. These operations can also be performed in a different order than those described herein.

It also should be understood that the illustrated method can end at any time and need not be performed in its entirety. Some or all operations of the method, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the process 500 can be implemented, at least in part, by modules running the features disclosed herein can be a dynamically linked library (DLL), a statically linked library, functionality produced by an application programing interface (API), a compiled program, an interpreted program, a script, or any other executable set of instructions. Data can be stored in a data structure in one or more memory components. Data can be retrieved from the data structure by addressing links or references to the data structure.

Although the illustration may refer to the components of the figures, it should be appreciated that the operations of the process 500 may also be implemented in other ways. In addition, one or more of the operations of the process 500 may alternatively or additionally be implemented, at least in part, by a chipset working alone or in conjunction with other software modules. In the example described below, one or more modules of a computing system can receive and/or process the data disclosed herein. Any service, circuit, or application suitable for providing the techniques disclosed herein can be used in operations described herein.

Figure 6:
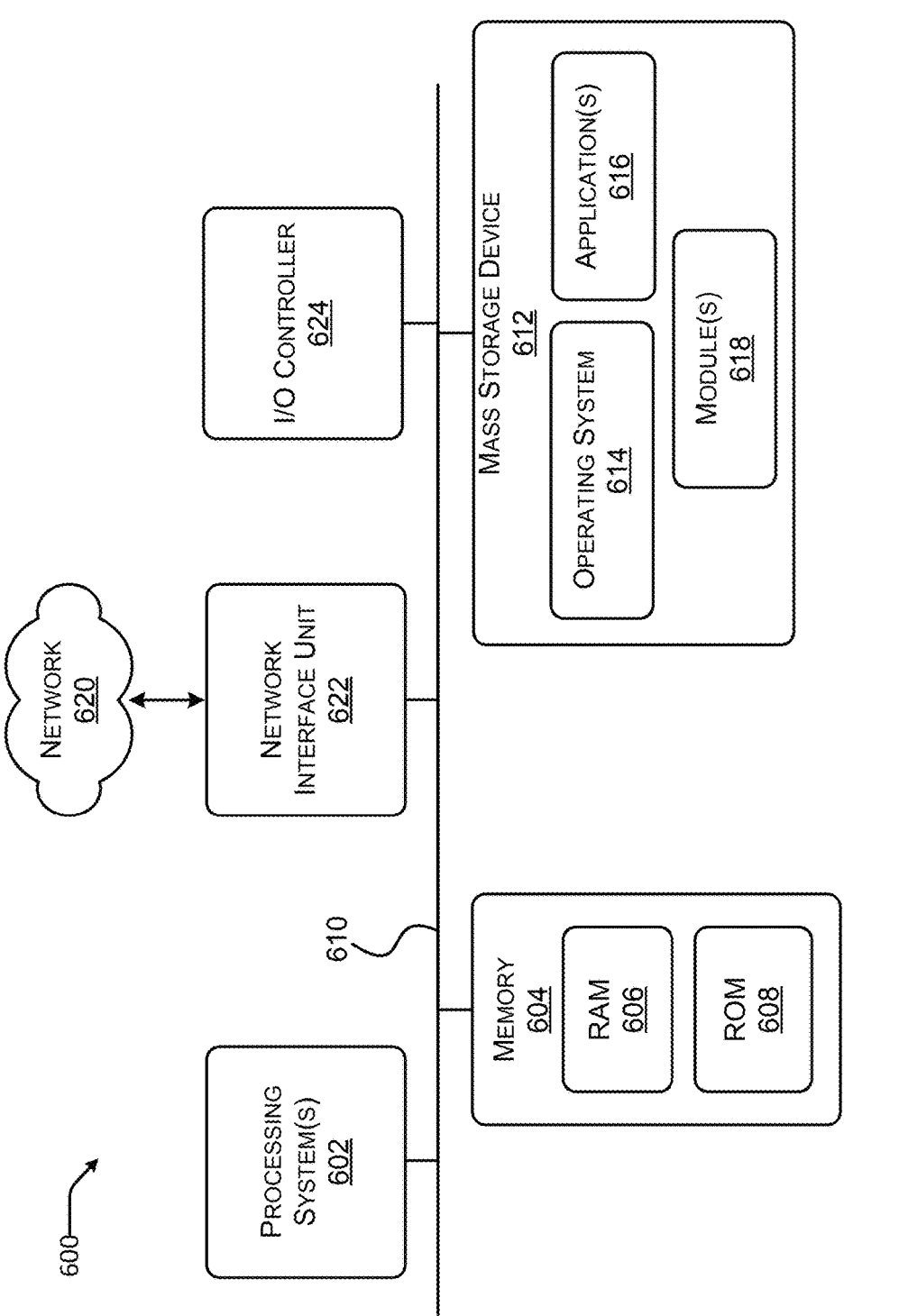
FIG. 6 is a computer architecture diagram illustrating an illustrative computer hardware and software architecture for a computing system capable of implementing aspects of the techniques and technologies presented herein.

FIG. 6 shows additional details of an example computer architecture 600 for a device, capable of executing computer instructions (e.g., a module or a program component described herein). The computer architecture 600 illustrated in FIG. 6 includes processing system 602, a system memory 604, including a random-access memory 606 (RAM) and a read-only memory (ROM) 608, and a system bus 610 that couples the memory 604 to the processing system 602. The processing system 602 comprises processing unit(s). In various examples, the processing unit(s) of the processing system 602 are distributed. Stated another way, one processing unit of the processing system 602 may be located in a first location (e.g., a rack within a datacenter) while another processing unit of the processing system 602 is located in a second location separate from the first location. Moreover, the systems discussed herein can be provided as a distributed computing system such as a cloud service.

Processing unit(s), such as processing unit(s) of processing system 602, can represent, for example, a CPU-type processing unit, a GPU-type processing unit, a field-programmable gate array (FPGA), another class of digital signal processor (DSP), or other hardware logic components that may, in some instances, be driven by a CPU. For example, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), and the like.

A basic input/output system containing the basic routines that help to transfer information between elements within the computer architecture 600, such as during startup, is stored in the ROM 608. The computer architecture 600 further includes a mass storage device 612 for storing an operating system 614, application(s) 616, modules 618, and other data described herein.

The mass storage device 612 is connected to processing system 602 through a mass storage controller connected to the bus 610. The mass storage device 612 and its associated computer-readable media provide non-volatile storage for the computer architecture 600. Although the description of computer-readable media contained herein refers to a mass storage device, the computer-readable media can be any available computer-readable storage media or communication media that can be accessed by the computer architecture 600.

Computer-readable media includes computer-readable storage media and/or communication media. Computer-readable storage media includes one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including RAM, static RAM (SRAM), dynamic RAM (DRAM), phase change memory (PCM), ROM, erasable programmable ROM (EPROM), electrically EPROM (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer-readable storage media, communication media can embody computer-readable instructions, data structures, program modules, or other data in a modulated data signal, such as a carrier wave, or other transmission mechanism. As defined herein, computer storage media does not include communication media. That is, computer-readable storage media does not include communications media consisting solely of a modulated data signal, a carrier wave, or a propagated signal, per se.

According to various configurations, the computer architecture 600 may operate in a networked environment using logical connections to remote computers through the network 620. The computer architecture 600 may connect to the network 620 through a network interface unit 622 connected to the bus 610. The computer architecture 600 also may include an input/output controller 624 for receiving and processing input from a number of other devices, including a keyboard, mouse, touch, or electronic stylus or pen. Similarly, the input/output controller 624 may provide output to a display screen, a printer, or other type of output device.

The software components described herein may, when loaded into the processing system 602 and executed, transform the processing system 602 and the overall computer architecture 600 from a general-purpose computing system into a special-purpose computing system customized to facilitate the functionality presented herein. The processing system 602 may be constructed from any number of transistors or other discrete circuit elements, which may individually or collectively assume any number of states. More specifically, the processing system 602 may operate as a finite-state machine, in response to executable instructions contained within the software modules disclosed herein. These computer-executable instructions may transform the processing system 602 by specifying how the processing system 602 transition between states, thereby transforming the transistors or other discrete hardware elements constituting the processing system 602.

Figure 7:
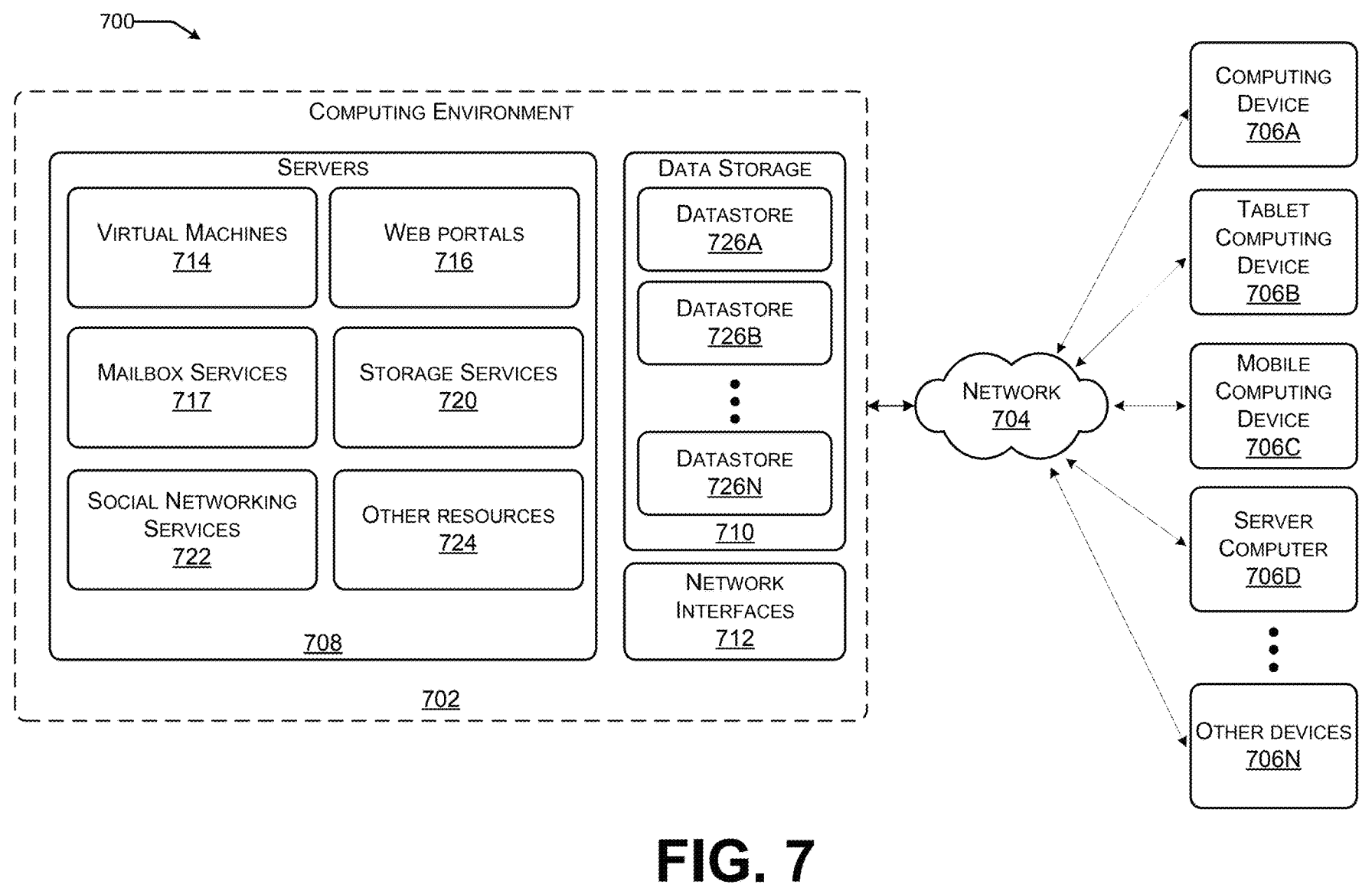

FIG. 7 depicts an illustrative distributed computing environment 700 capable of executing the software components described herein. Thus, the distributed computing environment 700 illustrated in FIG. 7 can be utilized to execute any aspects of the software components presented herein. For example, the distributed computing environment 700 can be utilized to execute aspects of the software components described herein.

Accordingly, the distributed computing environment 700 can include a computing environment 702 operating on, in communication with, or as part of the network 704. The network 704 can include various access networks. One or more client devices 706A-706N (hereinafter referred to collectively and/or generically as "computing devices 706") can communicate with the computing environment 702 via the network 704. In one illustrated configuration, the computing devices 706 include a computing device 706A such as a laptop computer, a desktop computer, or other computing device; a slate or tablet computing device ("tablet computing device") 706B; a mobile computing device 706C such as a mobile telephone, a smart phone, or other mobile computing device; a server computer 706D; and/or other devices 706N. It should be understood that any number of computing devices 706 can communicate with the computing environment 702.

In various examples, the computing environment 702 includes servers 708, data storage 710, and one or more network interfaces 712. The servers 708 can host various services, virtual machines, portals, and/or other resources. In the illustrated configuration, the servers 708 host virtual machines 714, Web portals 716, mailbox services 718, storage services 720, and/or social networking services 722. As shown in FIG. 7 the servers 708 also can host other services, applications, portals, and/or other resources ("other resources") 724.

As mentioned above, the computing environment 702 can include the data storage 710. According to various implementations, the functionality of the data storage 710 is provided by one or more databases operating on, or in communication with, the network 704. The functionality of the data storage 710 also can be provided by one or more servers configured to host data for the computing environment 700. The data storage 710 can include, host, or provide one or more real or virtual datastores 726A-726N (hereinafter referred to collectively and/or generically as "datastores 726"). The datastores 726 are configured to host data used or created by the servers 808 and/or other data. That is, the datastores 726 also can host or store web page documents, word documents, presentation documents, data structures, algorithms for execution by a recommendation engine, and/or other data utilized by any application program. Aspects of the datastores 726 may be associated with a service for storing files.

The computing environment 702 can communicate with, or be accessed by, the network interfaces 712. The network interfaces 712 can include various types of network hardware and software for supporting communications between two or more computing devices including the computing devices and the servers. It should be appreciated that the network interfaces 712 also may be utilized to connect to other types of networks and/or computer systems.

It should be understood that the distributed computing environment 700 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 700 provides the software functionality described herein as a service to the computing devices. It should be understood that the computing devices can include real or virtual machines including server computers, web servers, personal computers, mobile computing devices, smart phones, and/or other devices. As such, various configurations of the concepts and technologies disclosed herein enable any device configured to access the distributed computing environment 700 to utilize the functionality described herein for providing the techniques disclosed herein, among other aspects.

The disclosure presented herein also encompasses the subject matter set forth in the following clauses.

Example Clause A, a method for condensing a log file defining a state of a computing system during a failure for analysis by a diagnostic language model comprising: retrieving the log file comprising a first number of lexical units; preprocessing the log file to extract a second number of lexical units from the log file based on a relevance to the failure, the second number of lexical units being less than the first number of lexical units; generating a directional knowledge graph representing a condensed form of the log file using the second number of lexical units, wherein: the directional knowledge graph comprises a plurality of vertices connected by a plurality of edges; an individual vertex of the plurality of vertices represents a unique lexical unit of the second number of lexical units; and an individual edge of the plurality of edges represents a semantic connection between a pair of lexical units of the second number of lexical units; providing the directional knowledge graph representing the condensed form of the log file to the diagnostic language model; and receiving, from the diagnostic language model, a lexical analysis identifying a source of the failure for the computing system based on the directional knowledge graph representing the condensed form of the log file.

Example Clause B, the method of Example Clause A, wherein inputting the directional knowledge graph further comprises submitting an image rendering of the directional knowledge graph to the diagnostic language model.

Example Clause C, the method of Example Clause B, further comprising: determining, by the diagnostic language model, that the image rendering of the directional knowledge graph comprises a threshold level of similarity to a previously analyzed directional knowledge graph; and in response to determining that the image rendering of the directional knowledge graph comprises a threshold level of similarity to the previously analyzed directional knowledge graph, returning a lexical analysis that is similar to a lexical analysis derived from the previously analyzed directional knowledge graph.

Example Clause D, the method of Example Clause B, wherein a width of the individual edge represents a strength of the semantic connection represented by the individual edge.

Example Clause E, the method of any one of Example Clause A through D, wherein: the log file comprises a plurality of successful unit test logs and a plurality of unsuccessful unit test logs; and preprocessing the log file to extract the second number of lexical units from the log file based on a relevance to the failure comprises extracting the plurality of unsuccessful unit test logs.

Example Clause F, the method of Example Clause E, wherein preprocessing the log file to extract the second number of lexical units from the log file based on a relevance to the failure further comprises removing punctuation marks from the plurality of unsuccessful unit test logs.

Example Clause G, the method of any one of Example Clause A through F, wherein each individual vertex of the plurality of vertices is placed within the directional knowledge graph according to a relative position and frequency of occurrence of the unique lexical unit of the second number of lexical units within the log file.

Example Clause H, the method of any one of Example Clause A through G, wherein the lexical analysis comprises a plurality of diagnostic categories.

Example Clause I, the method of any one of Example Clause A through H, wherein: the directional knowledge graph representing the condensed form of the log file is a text file; and the directional knowledge graph representing the condensed form of the log file is input to the diagnostic language model by way of a text chat user interface.

Example Clause J, a system for condensing a log file defining a state of a computing system during a failure for analysis by a diagnostic language model comprising: a processing system; and a computer-readable medium having encoded thereon instructions that, when executed by the processing system, causes the system to perform operations comprising: retrieving the log file comprising a first number of lexical units; preprocessing the log file to extract a second number of lexical units from the log file based on a relevance to the failure, the second number of lexical units being less than the first number of lexical units; generating a directional knowledge graph representing a condensed form of the log file using the second number of lexical units, wherein: the directional knowledge graph comprises a plurality of vertices connected by a plurality of edges; an individual vertex of the plurality of vertices represents a unique lexical unit of the second number of lexical units; and an individual edge of the plurality of edges represents a semantic connection between a pair of lexical units of the second number of lexical units; providing the directional knowledge graph representing the condensed form of the log file to the diagnostic language model; and receiving, from the diagnostic language model, a lexical analysis identifying a source of the failure for the computing system based on the directional knowledge graph representing the condensed form of the log file.

Example Clause K, the system of Example Clause J, wherein inputting the directional knowledge graph further comprises submitting an image rendering of the directional knowledge graph to the diagnostic language model.

Example Clause L, the system of Example Clause K, the operations further comprising: determining, by the diagnostic language model, that the image rendering of the directional knowledge graph comprises a threshold level of similarity to a previously analyzed directional knowledge graph; and in response to determining that the image rendering of the directional knowledge graph comprises a threshold level of similarity to the previously analyzed directional knowledge graph, returning a lexical analysis that is similar to a lexical analysis derived from the previously analyzed directional knowledge graph.

Example Clause M, the system of any one of Example Clause J through L, wherein a width of the individual edge represents a strength of the semantic connection represented by the individual edge.

Example Clause N, the system of any one of Example Clause J through M, wherein: the log file comprises a plurality of successful unit test logs and a plurality of unsuccessful unit test logs; and preprocessing the log file to extract the second number of lexical units from the log file based on a relevance to the failure comprises extracting the plurality of unsuccessful unit test logs.

Example Clause O, the system of Example Clause N, wherein preprocessing the log file to extract the second number of lexical units from the log file based on a relevance to the failure further comprises removing punctuation marks from the plurality of unsuccessful unit test logs.

Example Clause P, the system of any one of Example Clause L through O, wherein each individual vertex of the plurality of vertices is placed within the directional knowledge graph according to a relative position and frequency of occurrence of the unique lexical unit of the second number of lexical units within the log file.

Example Clause Q, the system of any one of Example Clause L through P, wherein the lexical analysis comprises a plurality of diagnostic categories.

Example Clause R, the system of any one of Example Clause L through Q, wherein: the directional knowledge graph representing the condensed form of the log file is a text file; and the directional knowledge graph representing the condensed form of the log file is input to the diagnostic language model by way of a text chat user interface.

Example Clause S, a computer-readable storage medium having encoded thereon computer-readable instructions that when executed by a processing system causes the processing system to perform operations comprising: retrieving the log file comprising a first number of lexical units; preprocessing the log file to extract a second number of lexical units from the log file based on a relevance to the failure, the second number of lexical units being less than the first number of lexical units; generating a directional knowledge graph representing a condensed form of the log file using the second number of lexical units, wherein: the directional knowledge graph comprises a plurality of vertices connected by a plurality of edges; an individual vertex of the plurality of vertices represents a unique lexical unit of the second number of lexical units; and an individual edge of the plurality of edges represents a semantic connection between a pair of lexical units of the second number of lexical units; providing the directional knowledge graph representing the condensed form of the log file to the diagnostic language model; and receiving, from the diagnostic language model, a lexical analysis identifying a source of the failure for the computing system based on the directional knowledge graph representing the condensed form of the log file.

Example Clause T, the computer-readable storage medium of Example Clause S, wherein inputting the directional knowledge graph further comprises submitting an image rendering of the directional knowledge graph to the diagnostic language model.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

The terms "a," "an," "the" and similar referents used in the context of describing the invention (especially in the context of the following claims) are to be construed to cover both the singular and the plural unless otherwise indicated herein or clearly contradicted by context. The terms "based on," "based upon," and similar referents are to be construed as meaning "based at least in part" which includes being "based in part" and "based in whole" unless otherwise indicated or clearly contradicted by context.

In addition, any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The invention claimed is:

1. A method for condensing data defining a state of a computing system during an event for analysis by a language model, the model comprising:

retrieving the data comprising a first number of lexical units;

preprocessing the data to extract a second number of lexical units from the data based on a relevance to an issue that occurs during the event, the second number of lexical units being less than the first number of lexical units;

generating a directional knowledge graph representing a condensed form of the data using the second number of lexical units, wherein:

the directional knowledge graph comprises a plurality of vertices connected by a plurality of edges;

an individual vertex of the plurality of vertices represents a unique lexical unit of the second number of lexical units; and an individual edge of the plurality of edges represents a semantic connection between a pair of lexical units of the second number of lexical units;

providing the directional knowledge graph representing the condensed form of the data to the language model; and receiving, from the language model, a lexical analysis identifying a source of the issue that occurs during the event for the computing system based on the directional knowledge graph representing the condensed form of the data.

2. The method of claim 1, wherein inputting the directional knowledge graph further comprises submitting an image rendering of the directional knowledge graph to the language model.

3. The method of claim 2, further comprising:

determining, by the language model, that the image rendering of the directional knowledge graph comprises a threshold level of similarity to a previously analyzed directional knowledge graph; and in response to determining that the image rendering of the directional knowledge graph comprises the threshold level of similarity to the previously analyzed directional knowledge graph, returning a lexical analysis that is similar to a lexical analysis derived from the previously analyzed directional knowledge graph.

4. The method of claim 2, wherein a width of the individual edge represents a strength of the semantic connection represented by the individual edge.

5. The method of claim 1, wherein:

the data comprises a plurality of successful unit test logs and a plurality of unsuccessful unit test logs; and preprocessing the data to extract the second number of lexical units from the data based on the relevance to the issue that occurs during the event comprises extracting the plurality of unsuccessful unit test logs.

6. The method of claim 5, wherein preprocessing the data to extract the second number of lexical units from the data based on the relevance to the issue that occurs during the event further comprises removing punctuation marks from the plurality of unsuccessful unit test logs.

7. The method of claim 1, wherein each individual vertex of the plurality of vertices is placed within the directional knowledge graph according to a relative position and frequency of occurrence of the unique lexical unit of the second number of lexical units within the data.

8. The method of claim 1, wherein:

the data comprises a log file;

the issue that occurs during the event comprises a failure; and the lexical analysis comprises a plurality of diagnostic categories.

9. The method of claim 1, wherein:

the directional knowledge graph representing the condensed form of the data is a text file; and the directional knowledge graph representing the condensed form of the data is input to the language model by way of a text chat user interface.

10. A system for condensing data defining a state of a computing system during an event for analysis by a language model, the system comprising:

a processing system; and a computer-readable medium having encoded thereon instructions that, when executed by the processing system, cause the system to perform operations comprising:

retrieving the data comprising a first number of lexical units;

preprocessing the data to extract a second number of lexical units from the data based on a relevance to an issue that occurs during the event, the second number of lexical units being less than the first number of lexical units;

generating a directional knowledge graph representing a condensed form of the data using the second number of lexical units, wherein:

the directional knowledge graph comprises a plurality of vertices connected by a plurality of edges;

an individual vertex of the plurality of vertices represents a unique lexical unit of the second number of lexical units; and an individual edge of the plurality of edges represents a semantic connection between a pair of lexical units of the second number of lexical units;

providing the directional knowledge graph representing the condensed form of the data to the language model; and receiving, from the language model, a lexical analysis identifying a source of the issue that occurs during the event for the computing system based on the directional knowledge graph representing the condensed form of the data.

11. The system of claim 10, wherein inputting the directional knowledge graph further comprises submitting an image rendering of the directional knowledge graph to the language model.

12. The system of claim 11, the operations further comprising:

determining, by the language model, that the image rendering of the directional knowledge graph comprises a threshold level of similarity to a previously analyzed directional knowledge graph; and in response to determining that the image rendering of the directional knowledge graph comprises the threshold level of similarity to the previously analyzed directional knowledge graph, returning a lexical analysis that is similar to a lexical analysis derived from the previously analyzed directional knowledge graph.

13. The system of claim 11, wherein a width of the individual edge represents a strength of the semantic connection represented by the individual edge.

14. The system of claim 10, wherein:

the data comprises a plurality of successful unit test logs and a plurality of unsuccessful unit test logs; and preprocessing the data to extract the second number of lexical units from the data based on the relevance to the issue that occurs during the event comprises extracting the plurality of unsuccessful unit test logs.

15. The system of claim 14, wherein preprocessing the data to extract the second number of lexical units from the data based on the relevance to the issue that occurs during the event further comprises removing punctuation marks from the plurality of unsuccessful unit test logs.

16. The system of claim 10, wherein each individual vertex of the plurality of vertices is placed within the directional knowledge graph according to a relative position and frequency of occurrence of the unique lexical unit of the second number of lexical units within the data.

17. The system of claim 10, wherein:

the data comprises a log file;

the issue that occurs during the event comprises a failure; and the lexical analysis comprises a plurality of diagnostic categories.

18. The system of claim 10, wherein:

the directional knowledge graph representing the condensed form of the data is a text file; and the directional knowledge graph representing the condensed form of the data is input to the language model by way of a text chat user interface.

19. A computer-readable storage medium having encoded thereon computer-readable instructions that when executed by a processing system, cause the processing system to perform operations comprising:

retrieving the data comprising a first number of lexical units;

preprocessing the data to extract a second number of lexical units from the data based on a relevance to an issue that occurs during an event, the second number of lexical units being less than the first number of lexical units;

generating a directional knowledge graph representing a condensed form of the data using the second number of lexical units, wherein:

the directional knowledge graph comprises a plurality of vertices connected by a plurality of edges;

an individual vertex of the plurality of vertices represents a unique lexical unit of the second number of lexical units; and an individual edge of the plurality of edges represents a semantic connection between a pair of lexical units of the second number of lexical units;

providing the directional knowledge graph representing the condensed form of the data to a language model; and receiving, from the language model, a lexical analysis identifying a source of the issue that occurs during the event for a computing system based on the directional knowledge graph representing the condensed form of the data.

20. The computer-readable storage medium of claim 19, wherein inputting the directional knowledge graph further comprises submitting an image rendering of the directional knowledge graph to the language model.

* * * * *